(12) United States Patent
Xu et al.

(10) Patent No.: US 12,282,216 B2
(45) Date of Patent: Apr. 22, 2025

(54) DISPLAY MODULE, DISPLAY DEVICE, AND BACKLIGHT MODULE

(71) Applicants: BEIJING BOE DISPLAY TECHNOLOGY CO., LTD., Beijing (CN); BOE TECHNOLOGY GROUP CO., LTD., Beijing (CN)

(72) Inventors: Zhuang Xu, Beijing (CN); Jixing Sun, Beijing (CN); Changjia Fu, Beijing (CN); Dan Li, Beijing (CN); Zhaoshou Tian, Beijing (CN); Shanlei Hou, Beijing (CN); Hongbo Feng, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/260,510

(22) PCT Filed: Oct. 29, 2021

(86) PCT No.: PCT/CN2021/127593
§ 371 (c)(1),
(2) Date: Jul. 6, 2023

(87) PCT Pub. No.: WO2023/070561
PCT Pub. Date: May 4, 2023

(65) Prior Publication Data
US 2024/0302688 A1    Sep. 12, 2024

(51) Int. Cl.
*G02F 1/1333* (2006.01)
*G02F 1/1335* (2006.01)
*G02F 1/13357* (2006.01)

(52) U.S. Cl.
CPC .... *G02F 1/133317* (2021.01); *G02F 1/13336* (2013.01); *G02F 1/133504* (2013.01);
(Continued)

(58) Field of Classification Search
CPC .......... G02F 1/133317; G02F 1/13336; G02F 1/133504; G02F 1/133512; G02F 1/133602; G02F 2202/28
See application file for complete search history.

(56) References Cited

U.S. PATENT DOCUMENTS

2017/0315408 A1    11/2017   Lee et al.
2021/0124199 A1*   4/2021    Qing ................. G06V 40/1329
(Continued)

FOREIGN PATENT DOCUMENTS

CN        105066013 A    11/2015
CN        206557427 U    10/2017
(Continued)

*Primary Examiner* — Nathanael R Briggs
(74) *Attorney, Agent, or Firm* — LEASON ELLIS LLP

(57) ABSTRACT

A display module, a display device, and a backlight module avoid bad image quality. The display module includes: a backlight module and a display panel, and the backlight module includes: a back plate, a first light source and a middle frame, wherein the back plate includes a bottom plate; the first light source is on the bottom plate; the middle frame is between the bottom plate and the display panel, a concave part is on a surface of the middle frame adjacent to the display panel, and a second light source is in the concave part, such that bad image quality of the edge shadow of the display module is effectively avoided by arranging the second light source in the concave part of the surface of the middle frame adjacent to the display panel.

19 Claims, 5 Drawing Sheets

(52) U.S. Cl.
CPC .. *G02F 1/133512* (2013.01); *G02F 1/133602* (2013.01); *G02F 2202/28* (2013.01)

(56) References Cited

U.S. PATENT DOCUMENTS

2021/0335761 A1\* 10/2021 Huang ................... H01L 33/54
2024/0135741 A1\* 4/2024 Liu ...................... G06V 10/141

FOREIGN PATENT DOCUMENTS

| CN | 107340629 | A |   | 11/2017 |
|----|-----------|---|---|---------|
| CN | 111562695 | A |   | 8/2020  |
| CN | 113064302 | A | \* | 7/2021  |
| JP | 2007047241 | A |   | 2/2007  |

\* cited by examiner

DISPLAY MODULE, DISPLAY DEVICE, AND BACKLIGHT MODULE

CROSS-REFERENCE TO RELATED PATENT APPLICATIONS

This application is a U.S. National Stage Application under 35 U.S.C. § 371 of International Patent Application No. PCT/CN2021/127593, filed Oct. 29, 2021, which is incorporated by reference in its entirety. The international application was published on May 4, 2023, and received publication no. WO 2023070561 A1.

TECHNICAL FIELD

At least one embodiment of the present disclosure relates to a display module, a display device and a backlight module.

BACKGROUND

With the development of information technology and mobile communication technology, the number of display devices that process and display a large amount of information increases rapidly. With the continuous integration and development of liquid crystal display screens splicing technology and control technology, the large-screen image display formed by splicing a plurality of screens has been widely used. The large screen, multi-screen display, and clear and realistic display effect brought by splicing screen have greatly improved the work efficiency in monitoring, conference, simulation and other fields.

Display devices include luminescent display devices with self-luminous properties and non-luminescent display devices including additional light sources. Non-luminescent display devices include liquid crystal display (LCD) devices. Because the liquid crystal display device does not include a self-luminous element, an additional light source is required. Thus, a backlight unit with an additional light source is provided on the back surface of the liquid crystal display panel and supplies light to the liquid crystal display panel to enable the liquid crystal display panel to display an image. The backlight unit includes at least one of a group consisting of a cold cathode fluorescent lamp (CCFL), an external cathode fluorescent lamp (EEFL) and a light emitting diode (LED) as a light source. The light-emitting diode (LED) is widely used as a backlight because of the advantages such as small size, low power consumption and high reliability, and so on.

SUMMARY

At least one embodiment of the present disclosure provides a display module, a display device and a backlight module, the display device effectively avoids the bad image quality of the edge shadow of the display module by arranging the second light source in the concave part of the surface of the middle frame close to the display panel, the process difficulty of assembly and gluing of the display module is reduced, and it also solves the problem that the glue is easy to open between the backlight module and the display panel in the display module.

At least one embodiment of the present disclosure provides a display module, and the display module includes a backlight module and a display panel, in which the backlight module comprises: a back plate, comprising a bottom plate; a first light source, on the bottom plate; a diffusion plate, arranged parallel to the bottom plate; a middle frame, between the bottom plate and the diffusion plate; a concave part is on a surface of the middle frame close to the display panel, and a second light source is in the concave part.

For example, in the display module provided by at least one embodiment of the present disclosure, the concave part is in a middle region of the surface of the middle frame close to the display panel.

For example, in the display module provided by at least one embodiment of the present disclosure, the display panel and the surface of the middle frame close to the display panel are bonded by a first adhesive, and the first adhesive covers at least a part of the second light source.

For example, in the display module provided by at least one embodiment of the present disclosure, a size of the first adhesive in a direction parallel to a main surface of the bottom plate is larger than that of the concave part in the direction parallel to the main surface of the bottom plate.

For example, in the display module provided by at least one embodiment of the present disclosure, the first adhesive covers an entire surface of the middle frame close to the display panel.

For example, in the display module provided by at least one embodiment of the present disclosure, the concave part is at an edge position of the surface of the middle frame close to the display panel on a side, away from the first light source, of the surface of the middle frame.

For example, in the display module provided by at least one embodiment of the present disclosure, the display panel and the surface of the middle frame close to the display panel are bonded by a first adhesive, and the first adhesive at least covers a peripheral region of the concave part.

For example, in the display module provided by at least one embodiment of the present disclosure, the first adhesive covers a region of the surface of the middle frame close to the display panel except the concave part.

For example, in the display module provided by at least one embodiment of the present disclosure, the display panel comprises a liquid crystal cell and a diffusion plate, the diffusion plate is at a side of the liquid crystal cell close to the middle frame, and a light shielding part is at a side, away from the first light source, of the diffusion plate and the second light source.

For example, in the display module provided by at least one embodiment of the present disclosure, the diffusion plate and the liquid crystal cell are bonded by a second adhesive.

For example, in the display module provided by at least one embodiment of the present disclosure, the light shielding part is connected with a side surface of the middle frame away from the first light source and a side surface of the diffusion plate on a same side of the second light source.

For example, in the display module provided by at least one embodiment of the present disclosure, the surface of the middle frame close to the display panel has a chamfer on at least one side of the concave part.

For example, in the display module provided by at least one embodiment of the present disclosure, at least one side surface of the concave part is provided with a reflection film.

For example, in the display module provided by at least one embodiment of the present disclosure, a side of the middle frame close to the first light source has an arc-shaped surface protruding to a side of the first light source, and an optical film is on the arc-shaped surface, and the optical film is configured to guide light emitted by the first light source and irradiated on the optical film to the display panel.

For example, the display module provided by at least one embodiment of the present disclosure, further comprises a flexible circuit board arranged at a side of the middle frame away from the first light source, wherein the flexible circuit board is connected with the second light source, and the flexible circuit board is configured to provide a turn-on voltage to the second light source.

For example, the display module provided by at least one embodiment of the present disclosure, further comprises a printed circuit board and a connector, wherein the printed circuit board is configured to provide an integrated circuit to the flexible circuit board, and the connector is configured to connect the flexible circuit board with the printed circuit board.

For example, the display module provided by at least one embodiment of the present disclosure, further comprises a printed circuit board protection layer on a side of the printed circuit board away from the first light source.

For example, the display module provided by at least one embodiment of the present disclosure, further comprises a driver board on the printed circuit board, the driver board is connected with a side edge of the display panel, and the driver board is configured to drive the display panel to display.

For example, the display module provided by at least one embodiment of the present disclosure, further comprises a side adhesive on the side edge of the display panel, and the side adhesive is configured to fix the display panel.

For example, the display module provided by at least one embodiment of the present disclosure, further comprises a light shielding adhesive tape connected with an edge of the printed circuit board protection layer away from the first light source, an edge of the side adhesive away from the first light source and an edge of the flexible circuit board away from the first light source.

At least one embodiment of the present disclosure further provides a display device, and the display device includes a splicing screen constituted by a plurality of the display modules according to any one of the embodiments mentioned above.

For example, in the display device provided by at least one embodiment of the present disclosure, adjacent display modules of the plurality of the display modules are spliced by a light shielding adhesive tape comprised in each of the display modules.

At least one embodiment of the present disclosure further provides a backlight module, and the backlight module comprises: a back plate, comprising a bottom plate; a first light source, on the bottom plate; a middle frame, on the bottom plate, in which the middle frame has a first surface and a second surface that are opposite to each other, and the first surface is in contact with the bottom plate, the second surface of the middle frame is provided with a concave part, and a second light source is in the concave part.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

With the development of commercial display technology, people have higher and higher requirements for the narrow border and peripheral image quality of a splicing screen, and it has become an important goal in the field of splicing screen to realize the narrow border and no dark edges around the image quality of display module. At present, splicing screens that have been mass-produced in the market are pursuing extremely narrow borders, or there is a problem that adhesive between the backlight module and the display panel fails to stick because of too little adhesive, or there is a problem that light is blocked by too much adhesive between the backlight module and the display panel and the surrounding shadows appear, so the yield of high-quality display modules needs to be further improved. It can be seen that it is urgent to improve the image quality of the periphery region of the splicing screen and solve the problem that the adhesive between the backlight module and the display panel is easy to fail to stick while pursuing extremely narrow splicing gap.

Figure 1:
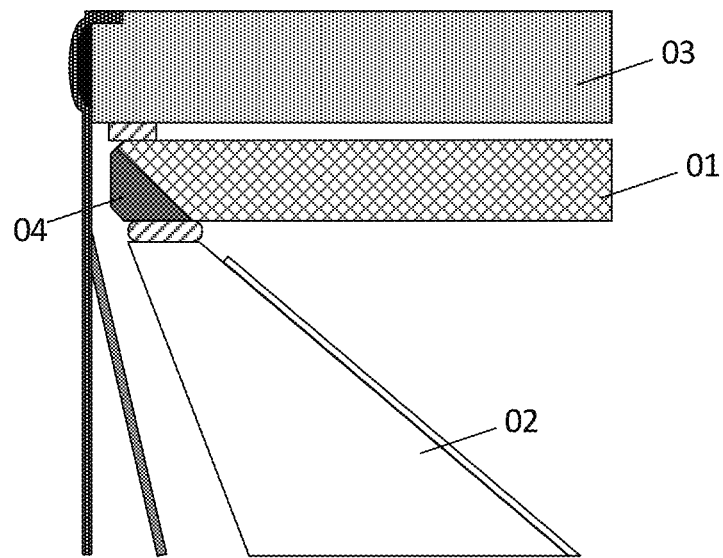
FIG. 1 is a schematic cross-sectional structure diagram of a display module.

For example, FIG. 1 is a schematic cross-sectional structure diagram of a display module. As shown in FIG. 1, a glass diffusion plate 01 is fixed on a supporting surface of a middle frame 02 through a gluing process, and the glass diffusion plate 01 and a liquid crystal cell 03 are also bonded through a gluing process. In order to ensure the firmness of bonding between the glass diffusion plate 01 and the liquid crystal cell 03, the gluing area between the glass diffusion plate 01 and the middle frame 02 can be widened, and the gluing area between the glass diffusion plate 01 and the middle frame 02 can be widened. However, according to the propagation direction of light, due to the limitation of the width of the surface of the middle frame 02 close to the glass diffusion plate 01, the end surface of the glass diffusion plate 01 is prone to have a light-free region 04, so that the periphery of the display module becomes dark, and the larger the width of the surface of the middle frame 02 close to the liquid crystal cell 03, the larger the area of the light-free region 04. For example, in FIG. 1, the gray triangle region is the light-free region 04, in order to ensure more light to enter the glass diffusion plate 01, the gluing area between the middle frame 02 and the glass diffusion plate 01 is usually required to be very small (generally 0.5 mm~1.5 mm), and the narrow gluing area can greatly increase the fineness of gluing, that is, it can increase the difficulty of gluing process. At the same time, the small gluing area between the middle frame 02 and the glass diffusion plate 01 is easy to cause the problem that the adhesive fails to stick, resulting in poor display. Finally, it is difficult to improve the yield of high-quality display modules.

The inventors of the present disclosure have noticed that a flexible light emitting diode can be attached to the outer side of the middle frame of each of the display modules, and then splicing screen with an extremely narrow can be formed, which can effectively improve the poor image quality of the shadow at the edge of each of the display modules, and at the same time, the gluing area between the supporting surface of the middle frame 02 and the glass diffusion plate 01 can be widened, so as to reduce the technological difficulty of gluing when the backlight module and the display panel are assembled to form the display module, and further solve the problem that the adhesive is easy to fail to stick between the middle frame 02 and the glass diffusion plate 01 in each of the display modules.

At least one embodiment of the present disclosure provides a display module, the display module comprises a backlight module and a display panel, the backlight module comprises a back plate, a first light source and a middle frame, the back plate comprises a bottom plate, the first light source is on the bottom plate, the middle frame is between the bottom plate and the display panel, a concave part is on a surface of the middle frame close to the display panel, and a second light source is in the concave part. According to the display module, the second light source is arranged in the concave part of the surface of the middle frame close to the display panel, so that the bad image quality of the shadow on the edge of the display module is effectively avoided, and the gluing area between the middle frame and the display panel is increased meanwhile, thereby reducing the technological difficulty of the gluing process in the process of manufacturing the display module, and further solving the problem that the adhesive between the backlight module and the display panel is easy to fail to stick in the display module.

Figure 2:
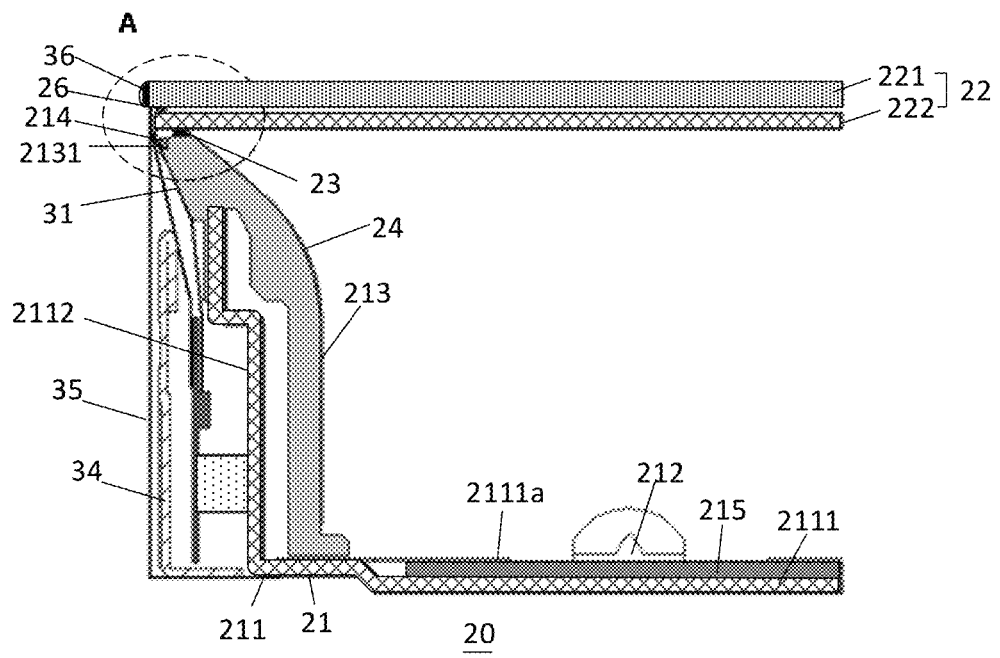
FIG. 2 is a schematic cross-sectional structure diagram of a display module provided by at least one embodiment of the present disclosure.

For example, FIG. 2 is a schematic cross-sectional structure diagram of a display module provided by at least one embodiment of the present disclosure. As shown in FIG. 2, the display module 20 includes a backlight module 21 and a display panel 22. The backlight module 21 includes a back plate 211, a first light source 212 and a middle frame 213. The back plate 211 includes a bottom plate 2111, and the first light source 212 is disposed on the bottom plate 2111, the middle frame 213 is disposed between the bottom plate 2111 and the display panel 213, a surface of the middle frame 213 close to the display panel 22 is provided with a concave part 2131, and a second light source 214 is arranged in the concave part 2131. By arranging the second light source 214 in the concave part 2131 of the surface of the middle frame 213 close to the display panel 22, the display module 20 effectively avoids the poor image quality of the shadow on the edge of the display module 20.

For example, as shown in FIG. 2, the concave part 2131 is arranged at an edge positon, away from the first light source 212, of the surface of the middle frame 213 close to the display panel 22, so that the surface of the middle frame 213 close to the display panel 22 has a first surface and a second surface with different distances from the display panel. The distance between the first surface and the display panel is greater than that between the second surface and the display panel, and the first surface is farther away from the first light source 212 and closer to the edge position than the second surface. The first surface is a bearing surface of the second light source 214, and the second surface is a surface where the middle frame 213 is bonded to the display panel 22 in the backlight module 21.

For example, the concave part 2131 may be a groove or a notch, and the cross-sectional shape of the concave part 2131 may also be a non-rectangular cross-sectional shape, which is not limited by the embodiment of the present disclosure.

For example, as shown in FIG. 2, the display panel 22 and the backlight module 21 are bonded by the first adhesive 23. Specifically, the surface of the middle frame 213 close to the display panel 22 included in the backlight module 21 is bonded with the display panel 22 by a first adhesive 23, that is, the middle frame 213 is bonded with the display panel 22 at the second surface by the first adhesive 23, and the first adhesive 23 may cover the entire of the second surface or cover a part of the second surface.

For example, in one example, the first adhesive 23 at least covers a peripheral region (part or all of the second surface) of the concave part 2131, and further, the first adhesive 23 covers a region of the surface of the middle frame 213 close to the display panel 22 except the concave part 2131. Because the second light source 214 is arranged in the concave part 2131 at the edge position, the dark region at the edge positon with insufficient light becomes bright due to the irradiation of the second light source 214, thus effectively avoiding the poor image quality of the shadow at the edge of the display module 20. In addition, the width of an end of the middle frame 213 close to the display panel 22 may be set to be larger, so that the coating area of the first adhesive 23 at the position where the middle frame 213 is bonded to the display panel 22 can be larger without causing weak light at the edge, thereby the bonding force between the middle frame 213 and the display panel 22 is stronger, thus solving the problem that the adhesive between the backlight module 21 and the display panel 22 in the display module 20 is easy to fail to stick.

For example, the first adhesive 23 is a transparent adhesive, and the first adhesive 23 may be ultraviolet curing adhesive, hot melt adhesive or adhesive formed by combining ultraviolet curing adhesive and hot melt adhesive, and the like. Light emitted by the first light source 212 and the second light source 214 can be transmitted to the display panel 22 through the first adhesive 23.

For example, the first light source 212 and the second light source 214 supply light to the display panel 22, so that the display panel 22 can display normally in both the middle region and the peripheral region. For example, the first light source 212 is the main light source for supplying light to the display panel 22 and includes a light emitting diode flexible circuit board and a plurality of first light emitting diodes located on the light emitting diode flexible circuit board. The light emitting diode flexible circuit board has a plate shape disposed on an inner surface of the bottom plate 2111 of the back plate 211. The plurality of first light emitting diodes are spaced apart from each other, so that the plurality of first light emitting diodes provide sufficient and uniform light for the display panel 22.

It should be noted that in the structure of the display module shown in FIG. 2, although only one first light source 212 is illustrated, a plurality of first light sources 212 may be included in the display module, which is not limited by the embodiment of the present disclosure.

It should also be noted that, in FIG. 2, although only one second light source 214 is shown in the concave part 2131 in the lateral direction parallel to the bottom plate 2111, in the actual product, a plurality of second light sources 214 are arranged around the display panel 22.

For example, in order to obtain higher emission efficiency and brighter luminous brightness, the plurality of first light emitting diodes may include a blue light emitting diode with a blue light emitting diode chip and a yellow fluorescent material, the yellow fluorescent material is, for example, cerium-doped yttrium aluminum garnet (YAG:Ce). Blue light emitted from the blue light emitting diode chip passes through the yellow fluorescent material and is mixed with yellow light emitted from the yellow fluorescent material, so that the first light emitting diode can finally emit white light.

For example, as shown in FIG. 2, the middle frame 213 may include a supporting body with an arc-shaped outer contour and a first supporting part and a second supporting part that are connected to two sides of the supporting body respectively. The first supporting part supported on the display panel 22, and the second supporting part is supported on the bottom plate 2111 of the back plate 211. In other exemplary embodiments, the middle frame 213 may have more structures to choose from, and these selected structures are within the scope of protection of the embodiments of the present disclosure.

For example, the surface of the first supporting part is the second surface, and the first supporting part is bonded to the display panel 22 on the second surface by the first adhesive 23.

For example, the middle frame 213 may maintain an optical gap between the first light source 212 and the display panel 22. In the direct backlight module 21 shown in FIG. 2, the optical gap is a space where light emitted by a plurality of first light emitting diodes are mixed. For example, the light emitted by the plurality of first light emitting diodes can be uniformly mixed in the optical gap, or the optical gap can prevent the thermal expansion of the display panel due to the heat generated by the plurality of first light emitting diodes.

For example, in one example, the middle frame 213 may be an aluminum extrusion. The aluminum extrusion has a relatively flat surface, so that the flat coating of the first adhesive 23 can be realized. It should be understood that in other exemplary embodiments, the middle frame 213 can also be an adhesive frame.

For example, the back plate 211 may further include a side plate 2112, and the middle frame 213 may further include a fixing part, the fixing part may be fixedly connected to the side plate 2112 of the back plate 211. This structural arrangement can increase the overall rigidity of the display module 20. The fixing part may be fixedly connected to the side plate 2112 of the back plate 211 by a bolt. There may be a plurality of fixing parts, the plurality of fixing parts can be distributed on the closed-loop structure formed by the middle frame 213 at intervals, and each of the fixing parts is fixedly connected with the side plate 2112 through a bolt.

It should be noted that, FIG. 2 only shows a schematic cross-sectional structure of half of the display module, and the middle frame can be in a closed ring shape, which is not limited by the embodiment of the present disclosure.

For example, as shown in FIG. 2, the bottom plate 2111 can further be provided with a reflective sheet 2111a to reflect the light emitted by the first light source 212, so as to maximize the utilization of the light emitted from the first light source 212.

For example, as shown in FIG. 2, one end of the middle frame 213 close to the first light source 212 has an arc-shaped surface protruding to one side of the first light source 212, and an optical film 24 is arranged on the arc-shaped surface, and the optical film 24 is configured to guide the light emitted by the first light source 212 onto the optical film 24 to the display panel 22. For example, the arc-shaped surface protruding to one side of the first light source 212 is more conducive to light conduction.

It should be noted that, because the optical film 24 has certain lateral light guiding property, in the case where the optical film 24 is not completely matched with the size of the outer contour of the arc-shaped surface of the middle frame 213 and there is a small error, that is, in the case where the optical film 24 is not completely attached to the arc-shaped surface of the middle frame 213, the optical film 24 can still realize the light guiding function.

For example, the optical film 24 arranged on the arc-shaped surface of the middle frame 213 can prevent the arc-shaped surface of the middle frame 213 from absorbing the light emitted by the first light source 212, thus avoiding the poor darkening of the edge of the display module 20. A specific embodiment of arranging the optical film 24 on the arc-shaped surface of the middle frame 213 may be to coat a layer of white paint on the arc-shaped surface of the middle frame 213. It should be understood that, in other exemplary embodiments, there may be more implementations of arranging the optical film 24 on the arc-shaped surface of the middle frame 213, for example, evaporating a reflective metal layer on the arc-shaped surface of the middle frame 213, which are all within the protection scope of the embodiments of the present disclosure.

For example, the optical film 24 may be connected to the display panel 22 through a transparent adhesive layer (not shown in FIG. 2). The transparent adhesive layer has strong light transmittance, and light from the light-emitting side of the optical film 24 can be transmitted to the display panel 22 through the transparent adhesive layer, so that the problem of poor display effect caused by the darkening of the frame of the display panel 22 can be avoided. For example, the transparent adhesive layer may be ultraviolet curing adhesive, hot melt adhesive or adhesive formed by combining ultraviolet curing adhesive and hot melt adhesive.

For example, as shown in FIG. 2, a circuit board 215 may be disposed between the bottom plate 2111 and the first light source 212, and the first light source 212 is fixed on the circuit board 215, and the circuit board 215 is configured to provide a turn-on voltage for the first light source 212.

Figure 3:
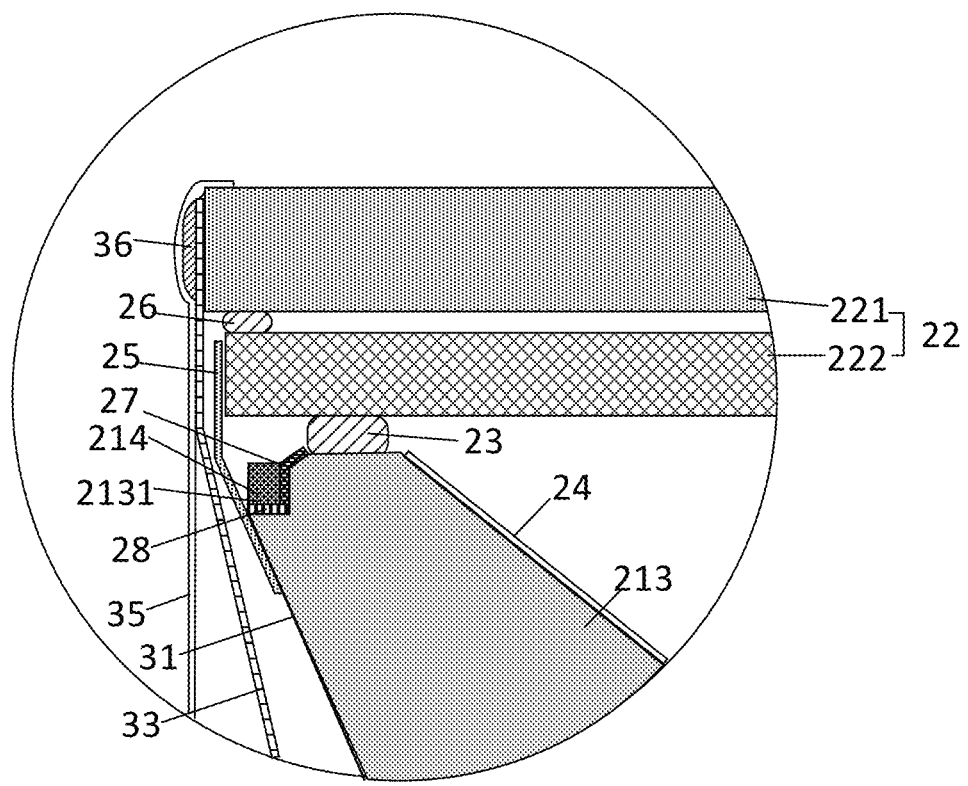
FIG. 3 is an enlarged structural diagram of the region A in FIG. 2.

For example, FIG. 3 is an enlarged structural diagram of the region A in FIG. 2. As shown in FIG. 2 and FIG. 3, the display panel 22 includes a liquid crystal cell 221 and a diffusion plate 222, the diffusion plate 222 is arranged on the side of the liquid crystal cell 221 close to the middle frame 213, and a light shielding part 25 is arranged on the side of both the diffusion plate 222 and the second light source 214 away from the first light source 212. For example, one end of the light shielding part 25 is connected with the side surface of the middle frame 213 away from the first light source 212, and the other end of the light shielding part 25 is connected with the side surface of the diffusion plate 222 on the same side of the second light source 214. The light shielding part 25 can prevent light emitted from the second light source 214 from leaking from the edge, so as to prevent interference with light in the adjacent display module spliced with the display module.

For example, as shown in FIG. 3, the diffusion plate 222 and the liquid crystal cell 221 are bonded by a second adhesive 26. The second adhesive 26 may be ultraviolet curing adhesive, hot melt adhesive or adhesive formed by combining ultraviolet curing adhesive and hot melt adhesive, and the like. Light emitted by the first light source 212 and the second light source 214 can be transmitted to the liquid crystal cell 221 through the second adhesive 26.

Figure 4:
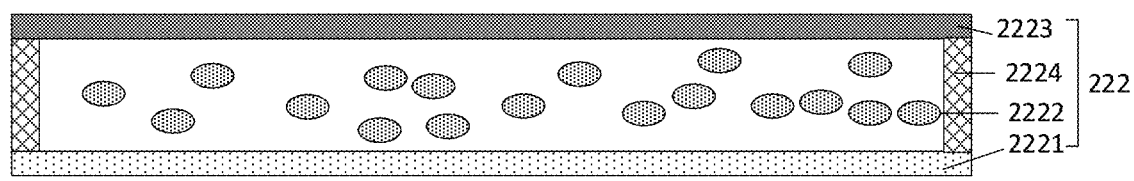
FIG. 4 is a schematic cross-sectional structure diagram of a diffusion plate provided by at least one embodiment of the present disclosure.

For example, FIG. 4 is a schematic cross-sectional structure diagram of a diffusion plate provided by at least one embodiment of the present disclosure. As shown in FIG. 4, the diffusion plate 222 may include a diffusion sheet 2221, a prism plate 2222, and a brightness enhancement plate 2223. The diffusion sheet 2221, the prism sheet 2222, and the brightness enhancement sheet 2223 may be sequentially laminated on a transparent substrate. The transparent substrate needs to have certain strength and resistance to thermal expansion and contraction. For example, the transparent substrate may be a glass substrate. It should be understood that in other exemplary embodiments, the diffusion plate 222 may also have other types of structures, for example, the diffusion sheet 2221, the prism plate 2222 and the brightness enhancement plate 2223 may be stacked in other order, or in one example, the diffusion plate only includes the diffusion sheet 2221 and the prism plate 2222, or other examples, which are all within the scope of protection of embodiments of the present disclosure.

Figure 5:
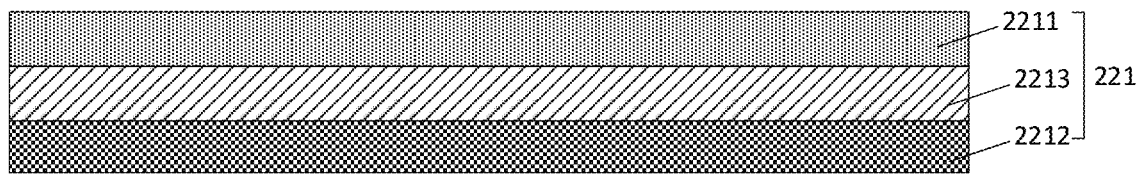
FIG. 5 is a schematic cross-sectional structure diagram of a liquid crystal cell provided by at least one embodiment of the present disclosure.

For example, FIG. 5 is a schematic cross-sectional structure diagram of a liquid crystal cell provided by at least one embodiment of the present disclosure. As shown in FIG. 5, the liquid crystal cell 221 includes a first substrate 2211 and a second substrate 2212 facing each other and separated from each other, and a liquid crystal layer 2213 between the first substrate 2211 and the second substrate 2212. A frame sealant 2224 is formed around the first substrate 2211 and the second substrate 2212. Although not shown, a plurality of gate lines and a plurality of data lines are formed on an inner surface of the first substrate (for example, an array substrate) 2211. The plurality of gate lines and the plurality of data lines cross each other to define pixel regions, and the thin film transistors (TFTs) are connected to both the gate lines and the data lines. The transparent pixel electrode in each of the pixel regions is electrically connected with the source electrode or the drain electrode of the thin film transistor. In addition, a black matrix covering the gate lines, the data lines and the thin film transistor is formed on an inner surface of the second substrate (e.g., a color filter substrate) 2212, and a color filter layer including a red filter, a green filter and a blue filter is formed on the black matrix, for example, a transparent common electrode is formed on the color filter layer.

As shown in FIG. 5, a first alignment layer is formed between the first substrate 2211 and the liquid crystal layer 2213, and a second alignment layer is formed between the second substrate 2212 and the liquid crystal layer 2213. In addition, a sealing pattern is formed in an edge portion between the first substrate 2211 and the second substrate 2212 to prevent the liquid crystal layer from leaking. A first polarizer (not shown in the figure) and a second polarizer (not shown in the figure) may also be respectively formed on an outer surface of the first substrate 2211 and an outer surface the second substrate 2212, which is not limited by the embodiment of the present disclosure.

For example, as shown in FIG. 3, the surface of the middle frame 213 close to the display panel 22 has a chamfer on at least one side of the concave part 2131, and in FIG. 3, it is shown that the surface of the middle frame 213 close to the display panel 22 has a chamfer on a side of the edge of the concave part 2131 away from the display region, which can make light emitted by the second light source 214 more divergent, so that the light emitted by the second light source 214 can be more evenly incident into the display panel 22, and finally, the quality of the image displayed by the display module is higher.

For example, as shown in FIG. 3, a reflection film 27 is provided on at least one side of the concave part 2131, and it is shown in FIG. 3 that a reflection film 27 is provided on the side of the concave part 2131 away from the edge of the display region, and the reflection film 27 can reflect the light emitted by the second light source 214 to the edge region, so that more light emitted from the second light source 214 is directed to the display panel 22, thereby improving the utilization rate of the light emitted by the second light source 214.

For example, as shown in FIG. 3, the second light source 214 is connected to the middle frame 213 through a double-sided adhesive tape 28 on the supporting surface of the middle frame 213.

Figure 6:
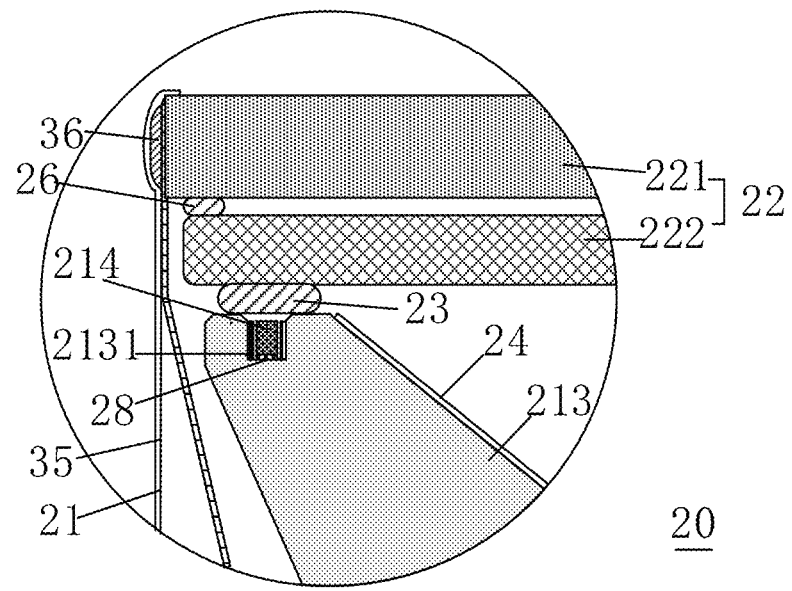
FIG. 6 is a schematic cross-sectional structure diagram of another display module provided by at least one embodiment of the present disclosure.

For example, FIG. 6 is a schematic cross-sectional diagram of another display module provided by at least one embodiment of the present disclosure. As shown in FIG. 6, the display module 20 includes a backlight module 21 and a display panel 22. The backlight module 21 includes a back plate 211, a first light source 212 and a middle frame 213. The back plate 211 includes a bottom plate 2111, and the first light source 212 is arranged on the bottom plate 2111. The middle frame 213 is arranged between the bottom plate 2111 and the display panel 22, and the surface of the middle frame 213 close to the display panel 22 is provided with a concave part 2131, the concave part 2131 is arranged in the middle region of the surface of the middle frame 213 close to the display panel 22, and a second light source 214 is arranged in the concave part 2131. The bad image quality of the edge shadow of the display module 20 is effectively avoided by arranging the second light source 214 in the concave part 2131 in the middle region of the surface of the middle frame 213 close to the display panel 22.

For example, the concave part 2131 is arranged in the middle region of the surface of the middle frame 213 close to the display panel 22, so that light emitted from the second light source 214 can be emitted to two sides of the concave part 2131, thereby improving the utilization rate of the light emitted from the second light source 214. Moreover, compared with setting the first adhesive 23 only at the edge position, setting the first adhesive 23 corresponding to the middle region of the concave part 2131 can make the backlight module 21 and the display panel 22 adhere more closely, so as to further reduce the risk of the phenomenon that the adhesive between the backlight module 21 and the display panel 22 fails to stick.

For example, as shown in FIG. 6, the display panel 22 and the surface of the middle frame 213 close to the display panel 22 are bonded by a first adhesive 23, and the first adhesive 23 covers at least a part of the second light source 214. For example, the first adhesive 23 is a transparent adhesive, and the first adhesive 23 can be ultraviolet curing adhesive, hot melt adhesive or adhesive formed by combining ultraviolet curing adhesive and hot melt adhesive, and the like. Even if the first adhesive 23 covers at least a part of the second light source 214, the light emitted by the first light source 212 and the second light source 214 can still be transmitted to the display panel 22 through the first adhesive 23. In the case where the first adhesive 23 covers the surface of the second light source 214, the utilization rate of the light emitted from the second light source 214 cannot be reduced.

For example, in one example, the first adhesive 23 can also be overlapped on the surface of the middle frame 213 close to the display panel 22 on two sides of the second light source 214, so that the coating area of the first adhesive 23 can be increased, thus solving the problem that the adhesive between the backlight module 21 and the display panel 22 in the display module 20 is easy to fail to stick.

For example, as shown in FIG. 6, the size of the first adhesive 23 in the direction parallel to the main surface of the bottom plate 2111 is larger than that of the concave part 2131 in the direction parallel to the main surface of the bottom plate 2111. The first adhesive 23 may cover the entire surface of the concave part 2131 and cover the surface of the middle frame 213 around the concave part 2131, so that the size of the first adhesive 23 in the direction parallel to the main surface of the bottom plate 2111 is larger than that of the concave part 2131 in the direction parallel to the main surface of the bottom plate 2111, or, the first adhesive 23 may cover a part of the surface of the concave part 2131, and cover most of the surface of the middle frame 213 around the concave part 2131 so that the size of the first adhesive 23 in the direction parallel to the main surface of the bottom plate 2111 is larger than that of the concave part 2131 in the direction parallel to the main surface of the bottom plate 2111, which is not limited by the embodiment of the present disclosure.

For example, in one example, the first adhesive 23 may cover the entire surface of the middle frame 213 close to the display panel 22, so that the adhesive area between the backlight module 21 and the display panel 22 can be maximized, thus solving the problem that the adhesive between the backlight module 21 and the display panel 22 in the display module 20 is easy to fail to stick.

For example, in FIG. 6, the side of the middle frame 213 close to the first light source 212 has an arc-shaped surface protruding to the side of the first light source 212, and an optical film 24 is arranged on the arc-shaped surface, and an optical film 24 is configured to guide the light emitted by the first light source 212 onto the optical film 24 to the display panel. For example, the curved surface protruding to one side of the first light source 212 is more conducive to light conduction.

It should be noted that because the optical film 24 has certain lateral light guiding property, in the case where the optical film 24 is not completely matched with the outer contour size of and the arc-shaped surface of the middle frame 213 and there is a small error, that is, in the case where the optical film 24 is not completely attached to the arc-shaped surface of the middle frame 213, the optical film 24 can still realize the light guiding function.

For example, setting the optical film 24 on the arc-shaped surface of the middle frame 213 can prevent the arc-shaped surface of the middle frame 213 from absorbing the light emitted by the first light source, thus avoiding the poor darkening of the edge of the display module. A specific embodiment of arranging the optical film 24 on the arc-shaped surface of the middle frame 213 may be to coat a layer of white paint on the arc-shaped surface of the middle frame 213. There are more ways to arrange the optical film 24 on the arc-shaped surface of the middle frame 213, for example, evaporating a reflective metal layer on the arc-shaped surface of the middle frame 213, which are all within the protection scope of the embodiment of the present disclosure.

For example, the optical film 24 may be connected to the display panel 22 through a transparent adhesive layer (not shown in FIG. 2). The transparent adhesive layer has strong light transmittance, and the light from the light-emitting side of the optical film 24 can be transmitted to the display panel 22 through the transparent adhesive layer, so that the problem of poor display effect caused by the darkening of the frame of the display panel 22 can be avoided. For example, the transparent adhesive layer can be ultraviolet curing adhesive, hot melt adhesive or adhesive formed by combining ultraviolet curing adhesive and hot melt adhesive, and the like.

Figure 7:
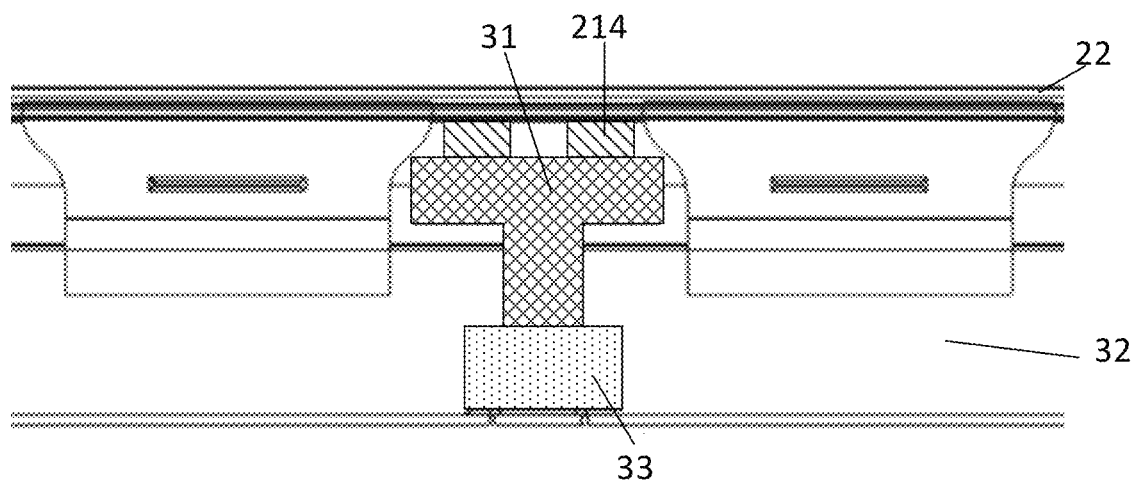
FIG. 7 is a schematic cross-sectional structure diagram of a circuit structure provided by at least one embodiment of the present disclosure.

For example, the circuit structure on the display module 20 will be described with reference to FIG. 2, and this circuit structure is also applicable to the structure shown in FIG. 6. For example, FIG. 7 is a schematic cross-sectional structure diagram of a circuit structure provided by at least one embodiment of the present disclosure. As shown in combination with FIG. 2 and FIG. 7, the display module 20 further includes a flexible circuit board 31 arranged on the side of the middle frame 213 away from the first light source 212, and the flexible circuit board 31 is connected with the second light source 214, and the flexible circuit board 31 is configured to provide a turn-on voltage to the second light source 214.

For example, as shown in FIG. 7, the display module 20 further includes a printed circuit board 32 and a connector 33, the printed circuit board 32 is configured to provide an integrated circuit to the flexible circuit board 31, the connector 33 is configured to connect the flexible circuit board 31 to the printed circuit board 32, for example, the printed circuit board 32 is a centralized component of various electrical connection lines, so as to miniaturize the display module 20.

For example, the flexible circuit board 31 is connected to at least one side of the second light source 214 through the connector 33. The flexible circuit board 31 is bent and the flexible circuit board 31 is brought into contact with the back surface of the bottom plate 2111 by modular processing.

For example, as shown in FIG. 2, the display module 20 further includes a printed circuit board protection layer 34 disposed on the side of the printed circuit board 32 away from the first light source 212, and the printed circuit board protection layer 34 can achieve protection on the printed circuit board 32, for example, protect the printed circuit board 32 from being scratched by an object with sharp external adhesive.

For example, as shown in FIG. 2 and FIG. 7, the display module 20 further includes a driver board 33 arranged on the printed circuit board 32, the driver board 33 is connected with the side edge of the display panel 22, and the driver board 33 is configured to drive the display panel 22 to display.

For example, the driver board 33 may be a source driving circuit board or a gate driving circuit board, and the display panel 22 may be bonded to the driver board 33 by an adhesive layer or fixedly connected to the driver board 33 by other fixing methods.

Figure 8:
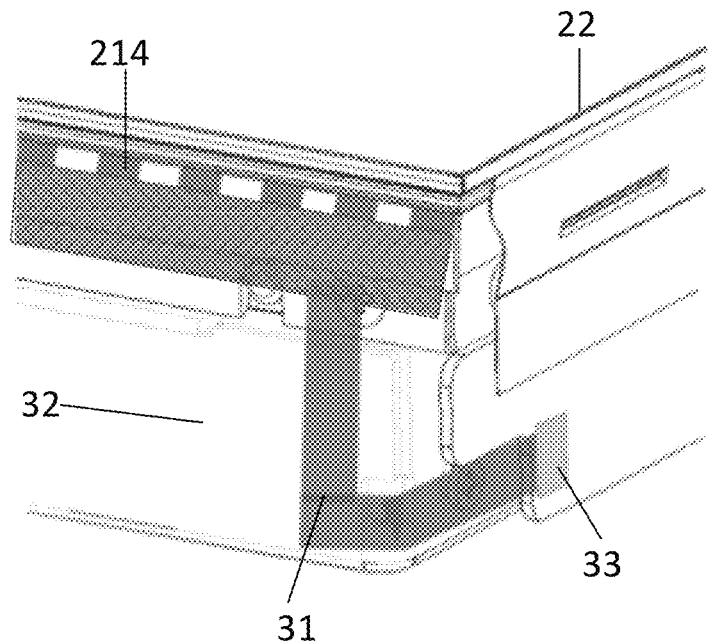
FIG. 8 is a schematic diagram of a three-dimensional structure of a display module provided by at least one embodiment of the present disclosure.

For example, FIG. 8 is a schematic diagram of a three-dimensional structure of a display module provided by at least one embodiment of the present disclosure, the three-dimensional structure of the display module is placed in a way that the display panel 22 is placed in an upward direction, and a plurality of second light sources 214 are arranged around the edge of the display panel 22 at intervals on the side of the display panel 22 close to the bottom plate 2111. The structures of the printed circuit board 32, the flexible circuit board 31, the driver board 33, the printed circuit board protection layer 34, etc. can refer to the above-mentioned related descriptions of FIG. 7, which are not repeated herein.

Although the driver board, the flexible circuit board, the printed circuit board, etc. are not shown in the embodiment shown in FIG. 6, these structures are also included in FIG. 6. For the arrangement of these structures, please refer to the above-mentioned related descriptions for FIG. 2, FIG. 7 and FIG. 8, which are not repeated herein.

For example, as shown in FIG. 2, FIG. 3 and FIG. 6, the display module 20 further includes a side adhesive 36 disposed on the side edge of the display panel 22, and the side adhesive 36 is configured to fix the display panel 22 so that the display panel 22 can be maintained in a stable state. For example, the side adhesive 36 can be the ultraviolet curing adhesive, the hot melt adhesive, or the combination of ultraviolet curing adhesive and hot melt adhesive, or the double-sided adhesive tape, which is not limited in the embodiment of the present disclosure, as long as the display panel 22 can be fixed.

For example, as shown in FIG. 2 and FIG. 8, the display module 20 further includes a light shielding adhesive tape 35 connected with the edge of the printed circuit board protection layer 34 away from the first light source 212, the edge of the side adhesive 36 away from the first light source 212 and the edge of the flexible circuit board 31 away from the first light source 212. For example, in the overall structure of the display module 20, the display module 20 includes protective shells arranged at each edge of the backlight module 21, and the protective shells may include a rubber frame part (not shown in the figure) and an adhesive tape part (that is the light shielding adhesive tape 35). The rubber frame part is connected with the bottom plate 2111 of the back plate, and the light shielding adhesive tape 35 is connected between the middle frame 213 and the rubber frame part, and covers a part of the surface of the display panel 22 away from the backlight module and a part of the surface of the back plate 211. In addition, the side surface of the display module 20 may be wrapped with sealant tape to seal the display module 20.

For example, the light shielding adhesive tape 35 can not only protect the printed circuit board protection layer 34, the side adhesive 36 and the flexible circuit board 31 connected to it, but also enable display modules to be spliced in the subsequently process where the splicing screen is formed.

Figure 9:
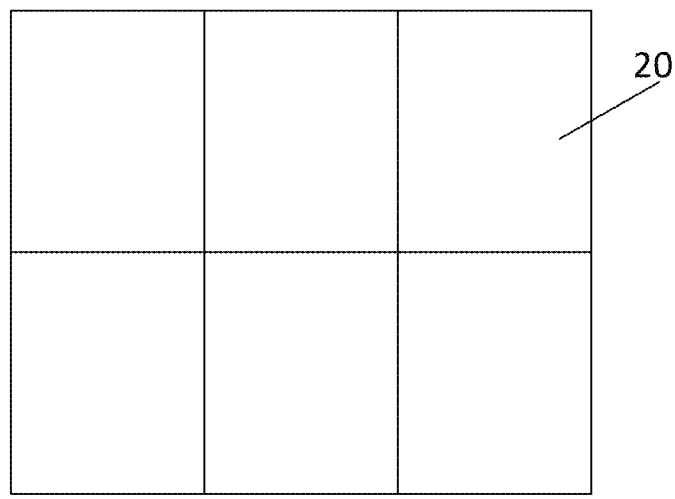
FIG. 9 is a schematic planar diagram of a display device provided by at least one embodiment of the present disclosure.

At least one embodiment of the present disclosure further provides a display device, for example, FIG. 9 is a schematic planar diagram of a display device provided by at least one embodiment of the present disclosure. As shown in FIG. 9, the display device 40 includes a splicing screen formed by a plurality of the display modules 20 provided by any one of the above embodiments. Although it is shown in FIG. 9 that the display device 40 includes the splicing screen formed by splicing six display modules 20, the embodiments of the present disclosure are not limited to this, and more display modules 20, such as two, four, nine, and so on, may be included, for example.

For example, the display device includes any one of the above mentioned display modules, and the display device in the embodiment of the present disclosure may be any product or component with a display function, such as a display, an OLED panel, an OLED TV, an electronic paper, a mobile phone, a tablet computer, a notebook computer, a digital photo frame, a navigator, etc.

The display device provided by the embodiment of the present disclosure has the same technical features and working principles as the above-mentioned display module, which are not repeated herein in the embodiments of the present disclosure.

For example, in the display device provided by at least one embodiment of the present disclosure, adjacent display modules are spliced with each other by the light shielding adhesive tape included in each of the display modules.

At least one embodiment of the present disclosure provides a backlight module, the backlight module comprises a back plate, a first light source and a middle frame, the back plate comprises a bottom plate, the first light source is on the bottom plate, the middle frame is arranged on the bottom plate, the middle frame has a first surface and a second surface that are opposite to each other, and the first surface is in contact with the bottom plate; the second surface of the middle frame is provided with a concave part, and a second light source is in the concave part. According to the backlight module, the second light source is arranged in the concave part of the second surface of the middle frame, so that the poor image quality of the shadow on the edge of the display module formed subsequently can be effectively avoided, and at the same time, the gluing area between the middle frame and the display panel in the display module formed subsequently can be set larger, so that the technological difficulty of gluing in the display module formed subsequently can be reduced, and the problem that the adhesive between the backlight module and the display panel in the display module formed subsequently is easy to fail to stick can be solved.

Figure 10:
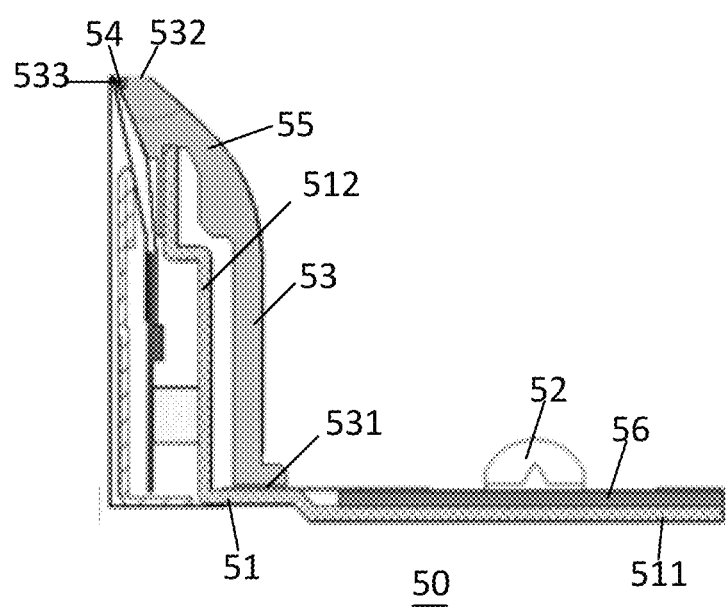
FIG. 10 is a schematic cross-sectional structure diagram of a backlight module provided by at least one embodiment of the present disclosure.

For example, FIG. 10 is a schematic cross-sectional structure diagram of a backlight module provided by at least one embodiment of the present disclosure. As shown in FIG. 10, the backlight module 50 includes a back plate 51, a first light source 52 and a middle frame 53, the back plate 51 includes a bottom plate 511, the first light source 52 is arranged on the bottom plate 511, and the middle frame 53 is arranged on the bottom plate 511, and the middle frame 53 has a first surface 531 and a second surface 532 that are opposite to each other. The first surface 531 is in contact with the base plate 511, the second surface 532 of the middle frame 53 is provided with a concave part 533, and a second light source 54 is disposed in the concave part 533.

For example, because the second light source 54 is arranged in the concave part 533 at the edge position, the dark region at the edge with insufficient light becomes bright due to the irradiation of the second light source 54, thus effectively avoiding the poor image quality of the shadow at the edge of the display module formed subsequently. That is, in the backlight module 50 provided by at least one embodiment of the present disclosure, the second light source 54 is arranged in the concave part 533 of the second surface 532 of the middle frame 53, so that the poor image quality of the shadow on the edge of the display module formed subsequently can be effectively avoided. In addition, the width of the second surface 532 of the middle frame 53 can be designed to be wider, and an adhesive with a larger area can be coated on the second surface 532 of the middle frame 53 based on the condition that it cannot cause the light at the edge to be weak, thus solving the problem that the adhesive between the backlight module 50 and the display panel in the subsequently formed display module is easy to fail to stick.

For example, as shown in FIG. 10, the middle frame 53 may be an aluminum extrusion. The aluminum extrusion has a relatively flat surface, so that the middle frame 53 can have a flat first surface 531 and a flat second surface 532 which are arranged opposite to each other. It should be understood that in other exemplary embodiments, the middle frame 53 may also be a rubber frame.

For example, as shown in FIG. 10, the back plate 51 may further include a side plate 512, and the middle frame 53 may further include a fixing part, the fixing part may be fixedly connected to the side plate 512 of the back plate 51. This structural arrangement can increase the overall rigidity of the backlight module 50. The fixing part can be fixedly connected to the side plate 512 of the back plate 51 by a bolt. There may be a plurality of fixing parts, the plurality of fixing parts are distributed on the closed-loop structure formed by the middle frame 53 at intervals, and each of the fixing parts is fixedly connected with the side plate 512 through a bolt.

For example, the first light source 52 and the second light source 54 can provide light sources, so that the final formed display module can display normally in both the middle region and the peripheral region. The functions of the first light source 52 and the second light source 54 can refer to the above descriptions based on the display module, which are not repeated herein.

For example, in order to obtain excellent emission efficiency and excellent luminous brightness, the first light source 52 and the second light source 54 may include a blue light emitting diode, the blue light emitting diode includes a blue light emitting diode chip and a yellow fluorescent material, for example, the yellow fluorescent material is cerium-doped yttrium aluminum garnet (YAG:Ce). Blue light emitted from the blue light emitting diode chip passes through the yellow fluorescent material and is mixed with yellow light emitted from the yellow fluorescent material, so that the first light emitting diode can finally emit white light.

For example, as shown in FIG. 10, a side of the middle frame 53 close to the first light source 52 has an arc-shaped surface protruding to one side of the first light source 52, and an optical film 55 is arranged on the arc-shaped surface, and the optical film 55 is configured to guide light emitted by the first light source 52 onto the optical film 55 into the display panel included in a subsequently formed display module to provide a backlight for the display panel. For example, the arc-shaped surface protruding to one side of the first light source 52 is more conducive to the transmission of light.

For example, as shown in FIG. 10, the middle frame 53 may include a supporting body (including the arc-shaped surface) with an arc-shaped outer contour, and a first supporting part and a second supporting part that are connected to two sides of the supporting body respectively. The first supporting part is supported on a display panel (not shown in FIG. 10) in a subsequently formed display module, and the first supporting part correspondingly has the second surface 532 of the middle frame 53. The second supporting part is supported on the bottom plate 511 of the back plate 51, and the second supporting part correspondingly has the first surface 531 of the middle frame 53. In other exemplary embodiments, the middle frame 53 can have more structures to choose from, and all of these structures are within the protection scope of the present disclosure.

For example, as shown in FIG. 10, a circuit board 56 may be disposed between the bottom plate 511 and the first light source 52, and the first light source 52 is fixed on the circuit board 56, and the circuit board 56 is configured to provide a turn-on voltage for the first light source 52.

For example, other structures in the backlight module 50 can be found in the above descriptions about the display module, which will not be repeated herein.

The display module, the display device and the backlight module provided by at least one embodiment of the present disclosure have at least one of the following beneficial technical effects:

(1) In the display module provided by at least one embodiment of the present disclosure, by arranging the second light source in the concave part of the surface of the middle frame close to the display panel, the poor image quality of the shadow on the edge of the display module is effectively avoided.

(2) In the display module provided by at least one embodiment of the present disclosure, by arranging the second light source in the concave part of the surface of the middle frame close to the display panel, the gluing area between the middle frame and the display panel can be designed to be larger, thus reducing the technological difficulty of gluing in the display module and solving the problem that the adhesive between the backlight module and the display panel is easy to fail to stick.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged or narrowed, that is, the drawings are not drawn in a real scale.

(3) In case of no conflict, the embodiments of the present disclosure and the features in the embodiments can be combined with each other to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A display module comprising:
a display panel; and
a backlight module including:
a back plate comprising a bottom plate;

a first light source disposed on the bottom plate;

a middle frame disposed between the bottom plate and the display panel; and a surface of the middle frame adjacent to the display panel has an opening to form a groove structure, and a second light source is provided in the groove structure, wherein at least one side surface of the groove structure is provided with a reflection film, and the reflective film is arranged between the second light source and an edge of the middle frame adjacent to the second light source.

2. The display module according to claim 1, wherein the groove structure is in a middle region of the surface of the middle frame adjacent to the display panel.

3. The display module according to claim 2, wherein the display panel and the surface of the middle frame adjacent to the display panel are bonded by a first adhesive, and the first adhesive covers at least a part of the second light source.

4. The display module according to claim 3, wherein a size of the first adhesive in a direction parallel to a main surface of the bottom plate is larger than a size of the groove structure in the direction parallel to the main surface of the bottom plate.

5. The display module according to claim 3, wherein the first adhesive covers an entire surface of the middle frame adjacent to the display panel.

6. The display module according to claim 1, wherein the groove structure is at an edge position of the surface of the middle frame adjacent to the display panel on a side of the surface of the middle frame away from the first light source.

7. The display module according to claim 6, wherein the display panel and the surface of the middle frame adjacent to the display panel are bonded by a first adhesive, and the first adhesive at least covers a peripheral region of the groove structure.

8. The display module according to claim 7, wherein the first adhesive covers a region of the surface of the middle frame adjacent to the display panel except the groove structure.

9. The display module according to claim 6, wherein the display panel comprises a liquid crystal cell and a diffusion plate, wherein the diffusion plate is at a side of the liquid crystal cell adjacent to the middle frame, and a light shielding part is at a side of the diffusion plate and the second light source away from the first light source.

10. The display module according to claim 9, wherein the diffusion plate and the liquid crystal cell are bonded together by a second adhesive.

11. The display module according to claim 9, wherein the light shielding part is connected to a side surface of the middle frame away from the first light source and connected to a side surface of the diffusion plate on a same side of the second light source.

12. The display module according to claim 1, wherein the surface of the middle frame adjacent to the display panel has a chamfer on at least one side of the groove structure.

13. The display module according to claim 12, wherein a side of the middle frame adjacent to the first light source has an arc-shaped surface protruding to a side of the first light source, and an optical film is on the arc-shaped surface, wherein the optical film is configured to guide light emitted by the first light source and irradiated on the optical film to the display panel.

14. The display module according to claim 1, further comprising a flexible circuit board arranged at a side of the middle frame away from the first light source, wherein the flexible circuit board is connected to the second light source, and the flexible circuit board is configured to provide a turn-on voltage to the second light source.

15. The display module according to claim 14, further comprising a printed circuit board and a connector, wherein the printed circuit board is configured to provide an integrated circuit to the flexible circuit board, and the connector is configured to connect the flexible circuit board to the printed circuit board.

16. The display module according to claim 15, further comprising a printed circuit board protection layer on a side of the printed circuit board away from the first light source.

17. A display device, comprising a splicing screen constituted by a plurality of the display modules according to claim 1.

18. The display device according to claim 17, wherein adjacent display modules of the plurality of the display modules are spliced by a light shielding adhesive tape comprised in each of the display modules.

19. A backlight module, comprising:

a back plate including a bottom plate;

a first light source disposed on the bottom plate;

a middle frame disposed on the bottom plate, wherein the middle frame has a first surface and a second surface that are opposite to each other, and the first surface is in contact with the bottom plate; and a surface of the middle frame adjacent to the display panel has an opening to form a groove structure, and a second light source is provided in the groove structure, wherein at least one side surface of the groove structure is provided with a reflection film, and the reflective film is arranged between the second light source and an edge of the middle frame adjacent to the second light source.

* * * * *